United States Patent
Kim et al.

(10) Patent No.: US 11,496,941 B2
(45) Date of Patent: Nov. 8, 2022

(54) NETWORK CONTROL METHOD FOR HANDOVER IN MOBILE TSN COMMUNICATION SYSTEM

(71) Applicant: KOREA UNIVERSITY OF TECHNOLOGY AND EDUCATION INDUSTRY—UNIVERSITY COOPERATION FOUNDATION, Cheonan-si (KR)

(72) Inventors: Won Tae Kim, Cheonan-si (KR); Han Jin Kim, Cheongju-si (KR); Young Jin Kim, Cheongju-si (KR); Jun Hyung Kwon, Boryeong-si (KR)

(73) Assignee: KOREA UNIVERSITY OF TECHNOLOGY AND EDUCATION INDUSTRY—UNIVERSITY COOPERATION FOUNDATION, Cheonan-si (KR)

( * ) Notice: Subject to any disclaimer, the term of this patent is extended or adjusted under 35 U.S.C. 154(b) by 2 days.

(21) Appl. No.: 17/171,003

(22) Filed: Feb. 9, 2021

(65) Prior Publication Data

US 2022/0217606 A1    Jul. 7, 2022

(30) Foreign Application Priority Data

Jan. 4, 2021 (KR) .......................... 10-2021-0000190

(51) Int. Cl.
*H04W 36/30* (2009.01)
*H04W 36/38* (2009.01)
*H04W 36/08* (2009.01)

(52) U.S. Cl.
CPC ........... *H04W 36/30* (2013.01); *H04W 36/08* (2013.01); *H04W 36/385* (2013.01)

(58) Field of Classification Search
CPC .... H04W 36/30; H04W 36/08; H04W 36/385
See application file for complete search history.

(56) References Cited

U.S. PATENT DOCUMENTS

2022/0014981 A1\* 1/2022 Pedersen ............... H04L 1/1887

FOREIGN PATENT DOCUMENTS

JP       2012-34054 A        2/2012
JP       2012034054 A   \*   2/2012

OTHER PUBLICATIONS

Communication dated Dec. 14, 2021 from the Korean Patent Office in Korean Application No. 10-2021-0000190.

(Continued)

*Primary Examiner* — Chi H Pham
*Assistant Examiner* — Ji-Hae Yea
(74) *Attorney, Agent, or Firm* — Sughrue Mion, PLLC

(57) ABSTRACT

A network control method for handover in a mobile time-sensitive network (TSN) communication system is provided. The network control method includes: communicating of a user terminal within a wireless communication range of a first AP with an end system through the first AP; determining whether to handover to a second AP by determining communication strength between the user terminal and the first AP; requesting handover to a controller when the handover to the second AP is determined; reconfiguring a TSN communication operation after the handover, determining handover timing, and generating a handover command by a controller; transmitting the handover command to the first AP, the user terminal, and the second AP; and applying the reconfigured TSN communication operation to the second AP and the user terminal at the handover timing.

4 Claims, 11 Drawing Sheets

(56) References Cited

OTHER PUBLICATIONS

CATT, "Discussion on TSC Assistance Information", 3GPP TSG-RAN WG3 #105, Aug. 2019, R3-193467, pp. 1-4 (4 pages total).
Nokia, Nokia Shanghai Bell, "Summary of e-mail discussion on TSN traffic patterns (with TP)", 3GPP TSG-RAN WG2 Meeting #105, R2-1900635, Mar. 2019 (29 pages total).

* cited by examiner

NETWORK CONTROL METHOD FOR HANDOVER IN MOBILE TSN COMMUNICATION SYSTEM

TECHNICAL FIELD

The present disclosure relates to a network control system and method for handover in a time-sensitive network (TSN) communication system, and more particularly, to a network control system and method for determining handover timing by reflecting a link delay of a TSN stream and applying a reconstructed TSN communication operation at the determined handover timing.

BACKGROUND ART

After the commercialization of LTE, a 3rd generation partnership project (3GPP) is currently discussing a frame structure for new radio (NR), a channel's modulation and coding scheme (MCS), and a multiple access scheme for research into the next generation/5G radio access technology. Such NR requires a design capable of satisfying various conditions, including an improved data rate, improved data processing speed, simultaneous access between multiple devices, and ultra-low latency real-time interworking compared to LTE/LTE-Advanced. Various communication methods are being discussed to implement a 5G communication system capable of meeting these requirements, and one of them is a communication method that interworks a time-sensitive network (TSN) and a 5G mobile communication network. This TSN method has versatility that can be applied to various wireless communication methods regardless of communication methods such as Wi-Fi, Bluetooth, and Zigbee, as well as 5G and LTE.

TSN refers to a network that transmits TSN data through a wired Ethernet network. The TSN may be applied to smart factories and the like. A TSN system and a TSN device constituting the TSN may share time reference, and transmit and receive the TSN data through the wired Ethernet network. The TSN system and a TSN node constituting the TSN that interworks with a 5G mobile communication network may transmit and receive the TSN data through the 5G mobile communication network as well as the wired Ethernet network.

Unlike a wired TSN, a communication node in a wireless TSN has a mobile feature. For this reason, in order for the network to provide a time sensitive communication service to the communication node, the mobility of the communication node needs to be considered. When a communication node moves between an access point (AP) and an AP, handover needs to be performed. When a mobile communication node requests handover, the communication network must be able to support performing a suitable handover procedure. Because the time sensitive communication service operates sensitively to time, the network needs to be controlled at the correct time to support an appropriate handover procedure according to the handover request. Especially, in the case of time-critical traffic such as a control command, if the network is not controlled in time and the network is not changed in time, the time sensitive communication service cannot support strict timing requirements of an application, which may have a major impact on the operation of the entire system.

As described above, it is desirable to minimize a transmission delay to transmit TSN data in a communication network interworking with a TSN. Therefore, in order to minimize the delay due to transmission of TSN data, it is necessary to improve a scheduling method of calculating delay occurring in a moving path of the TSN data and transmitting a handover command based on this.

SUMMARY

Provided are network control methods capable of preventing a transmission delay by calculating delay generated in the process of transmitting a handover command for applying a reconfigured TSN communication method and applying traffic scheduling to transmit the handover command.

According to an embodiment of the present disclosure, there is provided a network control method for handover in a mobile time-sensitive network (TSN) communication system, the network control method comprising: communicating of a user terminal within a wireless communication range of a first AP with an end system through the first AP; determining whether to handover to a second AP by determining communication strength between the user terminal and the first AP; requesting handover to a controller when the handover to the second AP is determined; reconfiguring a TSN communication operation after the handover, determining handover timing, and generating a handover command by a controller; transmitting the handover command to the first AP, the user terminal, and the second AP; and applying the reconfigured TSN communication operation to the second AP and the user terminal at the handover timing.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

BRIEF DESCRIPTION OF DRAWINGS

These and/or other aspects will become apparent and more readily appreciated from the following description of the embodiments, taken in conjunction with the accompanying drawings in which.

DESCRIPTION OF EMBODIMENTS

Hereinafter, a network control system and method for handover in a mobile TSN communication system according to some embodiments will be described with reference to FIGS. 1 to 11.

Figure 1:
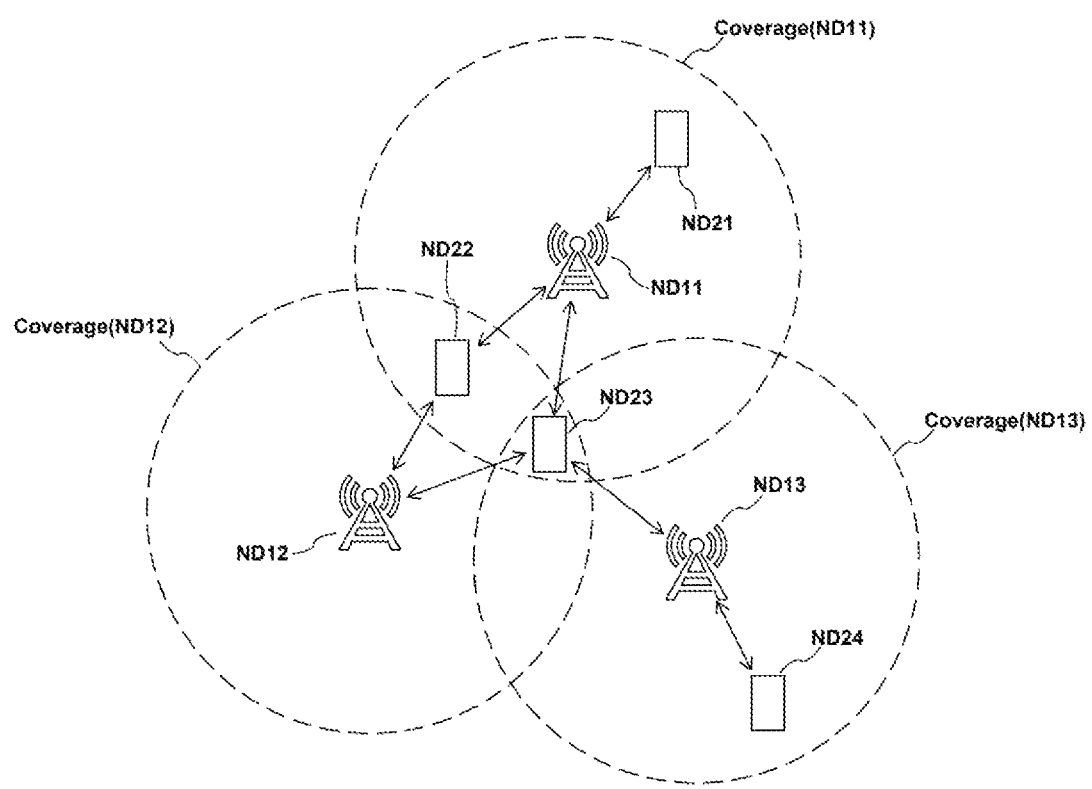
FIG. 1 is a view of a communication network.

FIG. 1 is a view of a communication network.

Referring to FIG. 1, a communication network according to some embodiments may include a plurality of communication nodes ND11, ND12, ND13, ND21, ND22, ND23, and ND24. Each of the plurality of communication nodes ND11, ND12, ND13, ND21, ND22, ND23, and ND24 may support at least one communication protocol. For example, each of the plurality of communication nodes ND11, ND12, ND13, ND21, ND22, ND23, and ND24 may support a communication protocol based on code division multiple access (CDMA), a communication protocol based on wideband CDMA (WCDMA), a communication protocol based on time division multiple access (TDMA), a communication protocol based on frequency division multiple access (FDMA), a communication protocol based on orthogonal frequency division multiplexing (OFDM), a communication protocol based on orthogonal frequency division multiple access (OFDMA), a communication protocol based on single carrier (SC)-FDMA, a communication protocol based on non-orthogonal multiple access (NOMA), and a communication protocol based on space division multiple access (SDMA). In addition, each of the plurality of communication nodes ND11, ND12, ND13, ND21, ND22, ND23, and ND24 may have the following structure.

Figure 2:
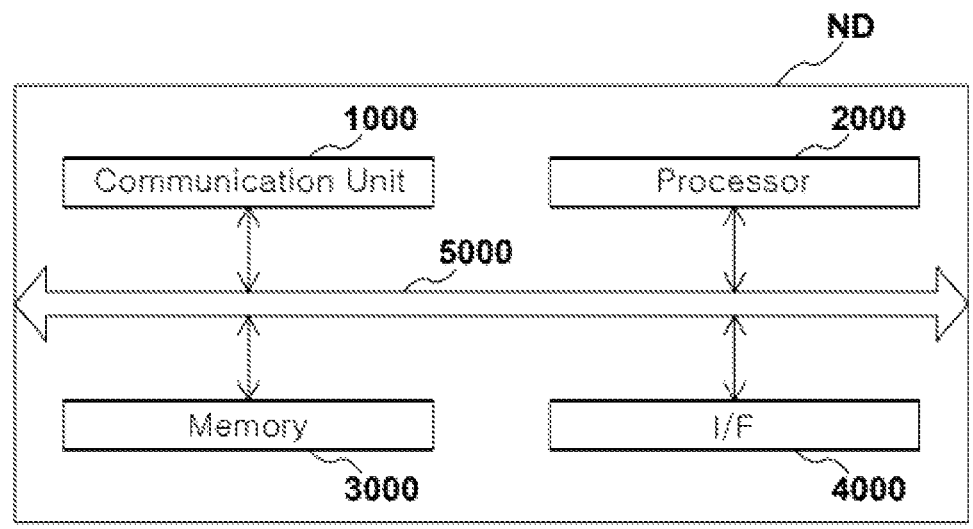
FIG. 2 is a block diagram of a configuration of a node of a communication network.

FIG. 2 is a block diagram of a configuration of a node of a communication network.

Referring to FIG. 2, each of the plurality of communication nodes ND11, ND12, ND13, ND21, ND22, ND23, and ND24 may include a communication unit 1000, a processor 2000, a memory 3000, an interface 4000, and a data bus 5000. In addition, the interface 4000 of each of the plurality of communication nodes ND11, ND12, ND13, ND21, ND22, ND23, and ND24 may further include an input interface device (not shown), an output interface device (not shown), and the like. Components included in each of the plurality of communication nodes ND11, ND12, ND13, ND21, ND22, ND23, and ND24 may be connected to each other by the data bus 5000 to communicate with each other. As another example, the components included in each of the communication nodes ND11, ND12, ND13, ND21, ND22, ND23, and ND24 may be connected to each other through an individual interface or an individual bus around the processor 2000 rather than the data bus 5000. For example, the processor 2000 may be connected to at least one of the communication unit 1000, the memory 3000, and the interface 4000 through a dedicated interface device.

The processor 2000 may execute a program command stored in the memory 3000. The processor 2000 may refer to a central processing unit (CPU), a graphics-processing unit (GPU), or a dedicated processor in which methods according to embodiments are performed. The memory 3000 may be configured with at least one of a volatile storage medium and a nonvolatile storage medium. For example, the memory 3000 may include at least one of read only memory (ROM) and random access memory (RAM).

According to some embodiments, each of the communication nodes ND11, ND12, ND13, ND21, ND22, ND23, and ND24 may further include a time synchronization unit. The time synchronization unit may perform time synchronization with other communication nodes in a network, and in particular, may perform a time synchronization operation with other communication nodes in order to perform a control command received from a controller 200 at accurate timing.

Referring back to FIG. 1, the communication system may include the plurality of base stations ND11, ND12, and ND13 and the plurality of user terminals ND21, ND22, ND23, and ND24. That is, the plurality of base stations ND11, ND12, and ND13 and the plurality of user terminals ND21, ND22, ND23, and ND24 included in the communication system may be communication nodes of a system. The base station ND11, the base station ND12, and the base station ND13 may form a coverage (ND11), a coverage (ND12), and a coverage (ND13), respectively.

Here, each of the plurality of base stations ND11, ND12, and ND13 may be referred to as next generation Node B (gNB), NodeB, evolved NodeB, a base transceiver station (BTS), a radio base station, a radio transceiver, an access point, an access node, a roadside unit (RSU), a digital unit (DU), a cloud digital unit (CDU), a radio remote head (RRH), a radio unit (RU), a transmission point (TP), a transmission and reception point (TRP), a relay node, or the like. Each of the plurality of user terminals ND21, ND22, ND23, and ND24 may be referred to as a terminal, an access terminal, a mobile terminal, a station, a subscriber station, a mobile station, a portable subscriber station, a node, a device, or the like.

Each of the plurality of communication nodes ND11, ND12, ND13, ND21, ND22, ND23, and ND24 may support cellular communication (e.g., long term evolution (LTE), LTE-A (advanced), 5G NR (new RAT), etc. specified in the 3rd generation partnership project (3GPP) standard). The plurality of base stations ND11, ND12, and ND13 may operate in different frequency bands or may operate in the same frequency band.

A wireless communication method may be applied to communication nodes of a network control system and method according to some embodiments, and the wireless communication method may include Wi-Fi, LTE, 5G, Bluetooth, Zigbee, etc., but the present disclosure is not limited thereto, and all types of wireless communication methods may be applied.

Each of the plurality of base stations ND11, ND12, and ND13 may support OFDMA-based downlink transmission and SC-FDMA-based uplink transmission. In addition, each of the plurality of base stations ND11, ND12, and ND13 may support multiple input multiple output (MIMO) transmission (e.g., single user (SU)-MIMO, multi-user (MU)-MIMO, massive MIMO, etc.), coordinated multipoint (CoMP) transmission, carrier aggregation transmission, unlicensed band transmission, or device-to-device (D2D) communication (or proximity services (ProSe)). Here, the plurality of user terminals ND21, ND22, ND23, and ND24 may perform operations corresponding to the base stations ND11, ND12, and ND13, or operations supported by the base stations ND11, ND12, and ND13, respectively.

In this specification, an end system 100 may refer to a talker in which a time-sensitive network (TSN) packet stream is generated, and a user terminal UE may refer to a listener receiving a stream from the talker through a relay system (bridge) or the like.

Figure 3:
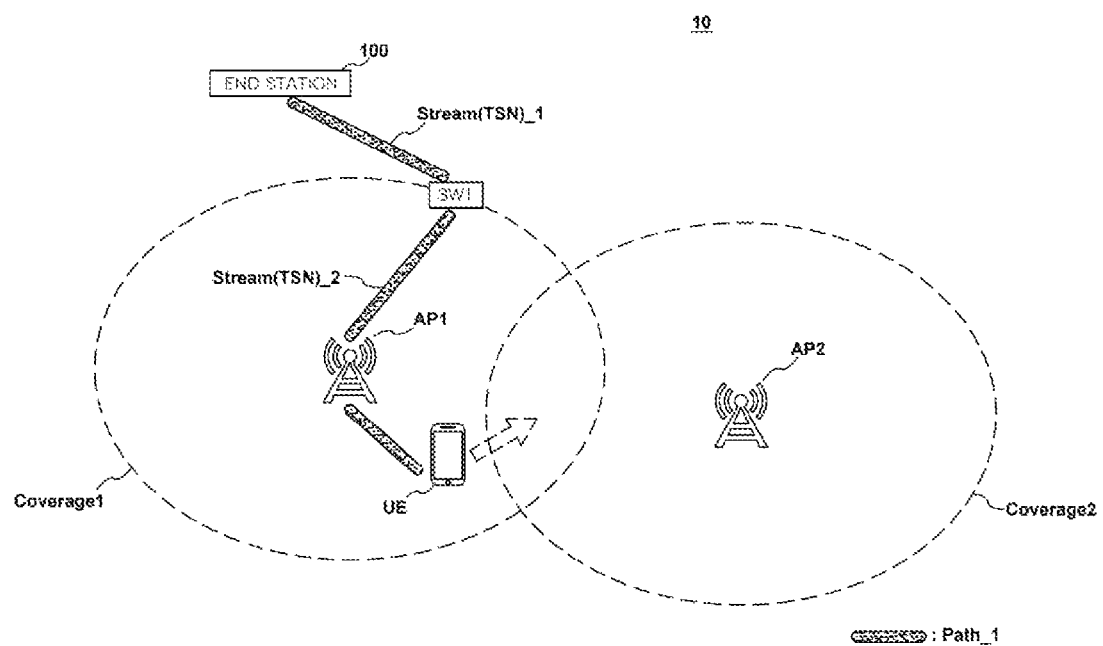
FIG. 3 is a view illustrating an embodiment in which a user terminal and an end system communicate through a first AP.
Figure 4:
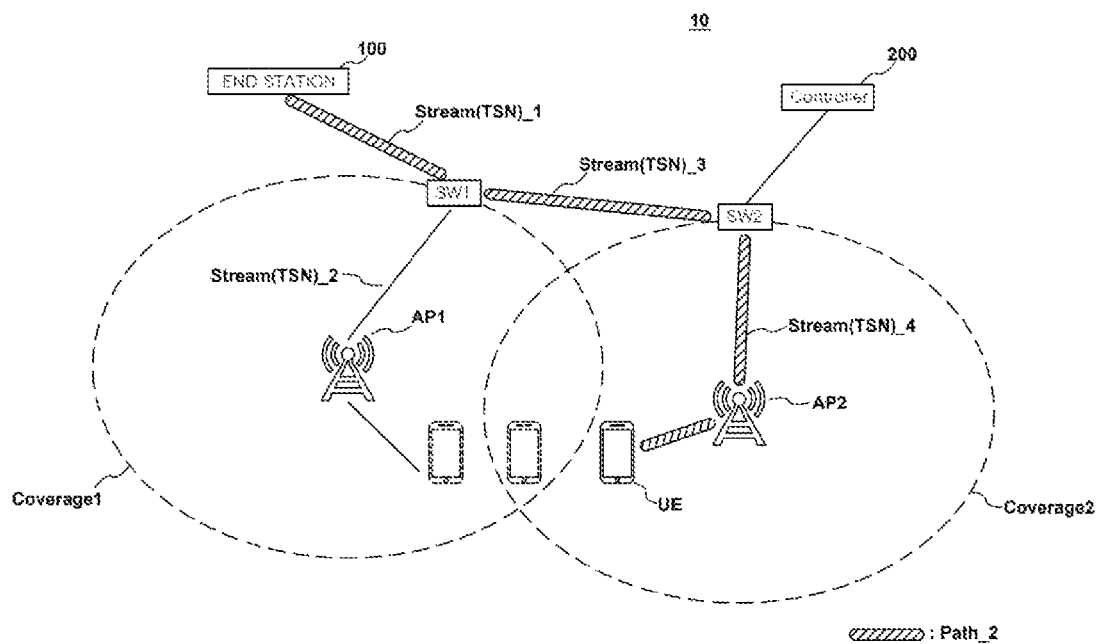
FIG. 4 is a view illustrating an embodiment in which a user terminal and an end system communicate through a second AP after handover.

FIG. 3 is a view illustrating an embodiment in which a user terminal and an end system communicate through a first AP, and FIG. 4 is a view illustrating an embodiment in which a user terminal and an end system communicate through a second AP after handover.

Referring to FIG. 3, a first AP AP1 and a second AP AP2 may have Coverage 1 and Coverage 2, respectively. The user terminal UE may perform communication with the end system 100, that is, data transmission/reception through the first AP AP1 and a first network switch SW1. It is assumed that the user terminal UE performing communication with the end system 100 using wireless TSN communication moves toward the second AP AP2, that is, Coverage 2, as shown.

According to some embodiments, the user terminal UE performing communication with the first AP AP1 in Coverage 1 may determine whether to handover by determining the communication strength with the first AP AP1. For example, when the communication strength with the first AP AP1 is less than a predefined reference value, handover may be determined. When the handover is determined, the user terminal UE may request the handover to the controller 200. According to another embodiment, the determination of whether to proceed with the handover may be performed by the first AP AP1.

Referring to FIG. 4, the user terminal UE may move into Coverage 2 by passing through an overlapping area of Coverage 1 and Coverage 2. In this case, the user terminal UE performs communication with the end system 100 through the second AP AP2. That is, the AP communicating with the user terminal UE is changed from the first AP AP1 to the second AP AP2, and at this time, a handover operation from the first AP AP1 to the second AP AP2 is performed.

Figure 5:
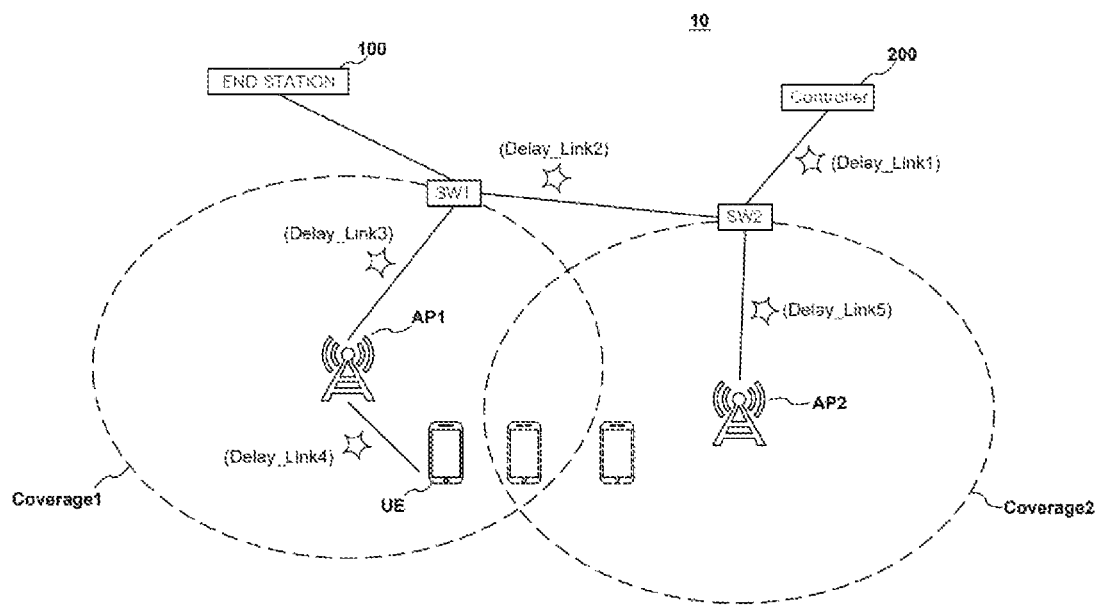
FIG. 5 is a view for explaining a link delay on a communication network.
Figure 6:
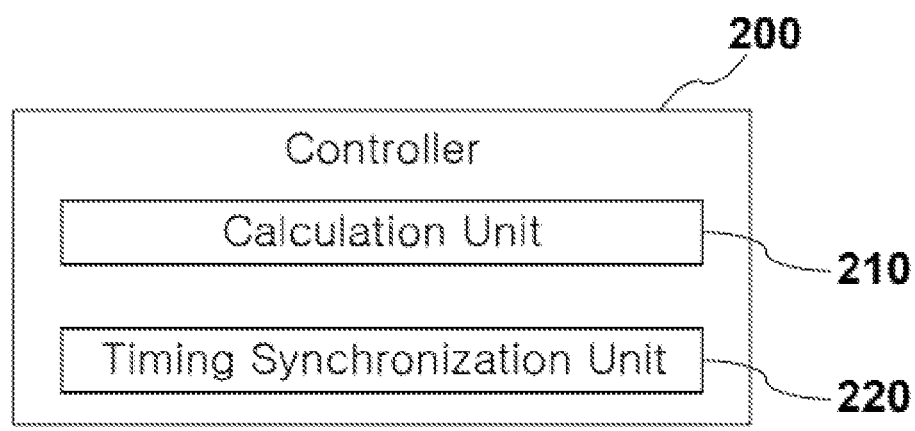
FIG. 6 is a block diagram of a controller according to some embodiments.

FIG. 5 is a view for explaining a link delay on a communication network, and FIG. 6 is a block diagram of a controller according to some embodiments.

Referring to FIG. 5, a plurality of link delays may occur while a handover command CMD_HO is transmitted.

In the case of a wireless TSN system in which a communication node is moved, the mobility of the communication node (e.g., the user terminal UE) needs to be considered, and when the user terminal UE moves between an AP and an AP, handover needs to be performed. When the communication note requests the handover, the communication network is required to support nodes to perform an appropriate handover operation in a timely manner.

As shown, it is assumed that the first AP AP1 is connected to the end system 100 through the first network switch SW1, the second AP AP2 is connected to the controller 200 and the first network switch through a second network switch SW2, and the second network switch SW2 is connected to the end system 100 through the first network switch SW1. In this case, the controller 200 generates and transmits a control command for controlling each of communication nodes, and controls communication of the communication notes. According to some embodiments, the controller may be a controller of SOFTWARE DEFINED NETWORKING, but is not limited thereto. It is understood that all kinds of controllers that can support handover procedures in an MTSN and provide a TSN service may be applied.

When the controller 200 transmits the handover command CMD_HO (e.g., including handover timing and reconfiguration during handover) to the communication nodes (UE, AP1, AP2, SW1, and SW2) where handover is performed, a link delay occurs in a link to which each node is connected. A link delay Delay_Link1 in a link between the controller 200 and the second network switch SW2, a link delay Delay_Link2 in a link between the first network switch SW1 and the second network switch SW2, a link delay Delay_Link3 in a link between the first network switch SW1 and the first AP AP1, a link delay Delay_Link4 in a link between the first AP AP1 and the user terminal UE, and a link delay Delay_Link5 in a link between the second network switch SW2 and the second AP AP2 may occur.

That is, the controller 200 calculates handover timing and transmits the handover command CMD_HO including the calculated handover timing to each of the communication nodes. In this case, the timing at which the handover command CMD_HO is transmitted to each of the communication nodes should consider the calculated handover timing and the link delay that may occur in each link. Also, the time at which the handover command CMD_HO including the calculated handover timing is transmitted to the user terminal UE should consider the sum of link delays of respective paths and an additional time margin. In this case, the additional time margin may be a preset value considering all factors such as delay due to a physical collision or the like.

For example, the time at which the handover command CMD_HO generated by the controller 200 is transmitted to the user terminal UE in Coverage 1 may be determined considering the link delay Delay_Link1, the link delay Delay_Link2, the link delay Delay_Link3, the link delay Delay_Link4, and a predefined additional time margin. As another example, the time at which the handover command CMD_HO is transmitted to the second AP AP2 may be determined by considering the link delay Delay_Link1, the link delay Delay_Link5, and an additional time margin.

According to some embodiments of the present disclosure, the transmission time is determined by reflecting a link delay of a path through which the handover command CMD_HO is transmitted, and the handover command CMD_HO is output from the controller 200 considering handover application timing and a transmission time of the handover command, so that a TSN operation may be applied (reconfigured) in a timely manner through a handover procedure.

Referring to FIG. 6, the controller 200 according to some embodiments may include a calculation unit 210 and a timing synchronization unit 220. The calculation unit 210 may calculate handover application timing, determine a data path after the handover is applied, and calculate a transmission time point of the handover command CMD_HO. The timing synchronization unit 220 may synchronize and store timing of each communication node. For example, when the handover command CMD_HO is transmitted to each communication node and a handover operation is performed, information about the time at which the handover operation is performed and an applied TSN communication operation may be synchronized.

Figure 7:
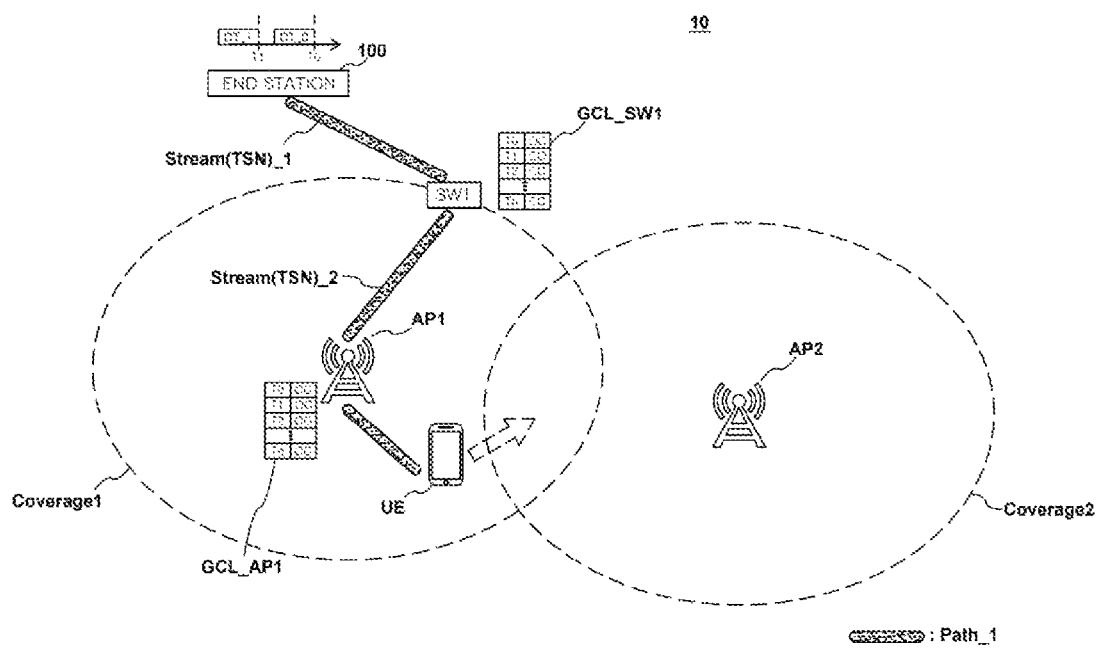
FIG. 7 is a view for explaining a TSN communication operation before handover, according to some embodiments.
Figure 8:
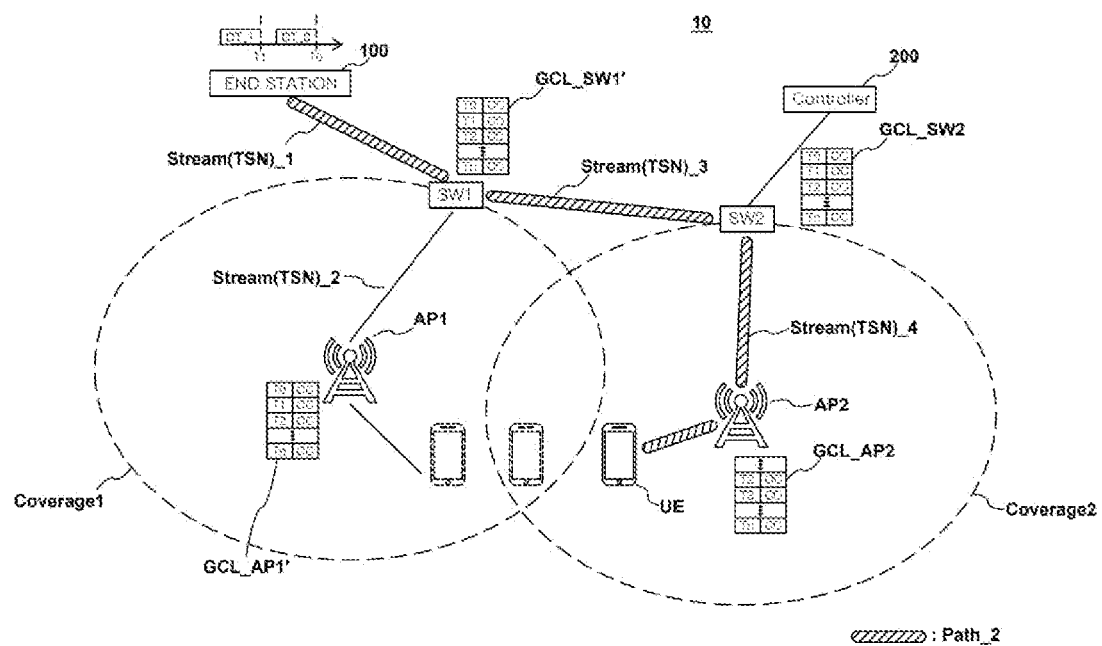
FIG. 8 is a view for explaining a TSN communication operation after handover, according to some embodiments.

FIG. 7 is a view for explaining a TSN communication operation before handover, according to some embodiments, and FIG. 8 is a view for explaining a TSN communication operation after handover, according to some embodiments.

Referring to FIGS. 7 and 8, the network control system 10 according to some embodiments may perform a handover operation by applying a reconfigured TSN communication operation in a timely manner. For example, a transmission gate may be adjusted in a timely manner by changing a gate control list (GCL), that is, an open/close (O/C) operation according to a gate cycle period according to a handover procedure. In other words, by changing the O/C operation of a gate according to the time of each communication node and applying the changed GCL to handover timing, a time sensitive communication operation may be smoothly performed.

As shown in FIG. 7, before handover, the end system 100 and the user terminal UE perform communication through a first path Path_1. Data is transmitted to the first AP AP1 through a first TSN stream Stream(TSN)_1 between the end system 100 and the first network switch SW1 and a second TSN stream Stream(TSN)_2 between the first network switch SW1 and the first AP AP1, and finally communicates with the user terminal UE based on a GCL of the first AP AP1. A gate on which data DT_0 is queued according to a first network switch GCL GCL_SW1 is opened at a time point T0 and the data DT_0 is transmitted to the first AP AP1, and a gate on which the data DT_0 is queued according to a first AP GCL GCL AP1 is opened at a time point T1 and the data DT_0 is transmitted to the user terminal UE.

Referring to FIG. 8, the controller 200 according to some embodiments may generate a handover command to perform a handover operation by changing a GCL of each communication node.

When the handover operation is performed in a timely manner, a communication path between the end system 100 and the user terminal UE is changed, and the GCLs of the communication nodes to which handover is applied, that is, the first network switch SW1, the first AP AP1, the second network switch SW2, and the second AP AP2 may be changed.

The communication path between the end system 100 and the user terminal UE is changed to a second path Path_2. As shown, data of the end system 100 is transmitted to the second AP AP2 through the first TSN stream Stream(TSN)_1, a third TSN stream Stream(TSN)_3, and a fourth TSN stream (Stream(TSN)_4), and the user terminal UE in Coverage 2 may communicate with the end system 100 through wireless communication with the second AP AP2.

Path information of a first network switch GCL GCL_SW1' may be changed. That is, the path information may be modified such that data is output to the second network switch SW2 through the third TSN stream Stream (TSN)_3 instead of the second TSN stream Stream(TSN)_2. A first AP GCL GCL_AP1' may be changed such that a gate is closed at all times within a corresponding cycle. In other words, because there is no need to perform wireless communication between the user terminal UE and the first AP AP1 after handover, a GCL of a corresponding gate may be changed.

A second network switch GCL GCL_SW2 and a second AP GCL GCL_AP2 may be modified and applied so that data output from the first network switch SW1 is provided to the user terminal UE in a timely manner. For example, the data DT_0 is transmitted from the first network switch SW1 to the second network switch SW2 at the time point T0, and a gate on which the data DT_0 is queued according to the second network switch GCL GCL_SW2 is opened at the time point T1 and the data DT_0 is transmitted to the second AP AP2. Thereafter, a gate of the second AP AP2 on which the data DT_0 is queued according to the second AP GCL GCL_AP2 is opened at the time point T2 and the data DT_0 may be transmitted to the user terminal UE.

For illustrative purposes, the network control system 10 for handover according to some embodiments has been described to be applied to traffic control in a time-aware shaper (TAS), but is not limited thereto, and may be applied to all operations that can be scheduled in a TSN network infrastructure. For example, it is understood that the present disclosure for controlling timing at which the handover command CMD_HO is transmitted may be applied to a traffic control operation in an asynchronous traffic shaper (ATS), a credit-based shaper (CBS), or the like. In addition, it is obvious that the same may be applied to stream reservation/management and redundant stream (path) selection scheduling applied in the TSN network technology.

Figure 9:
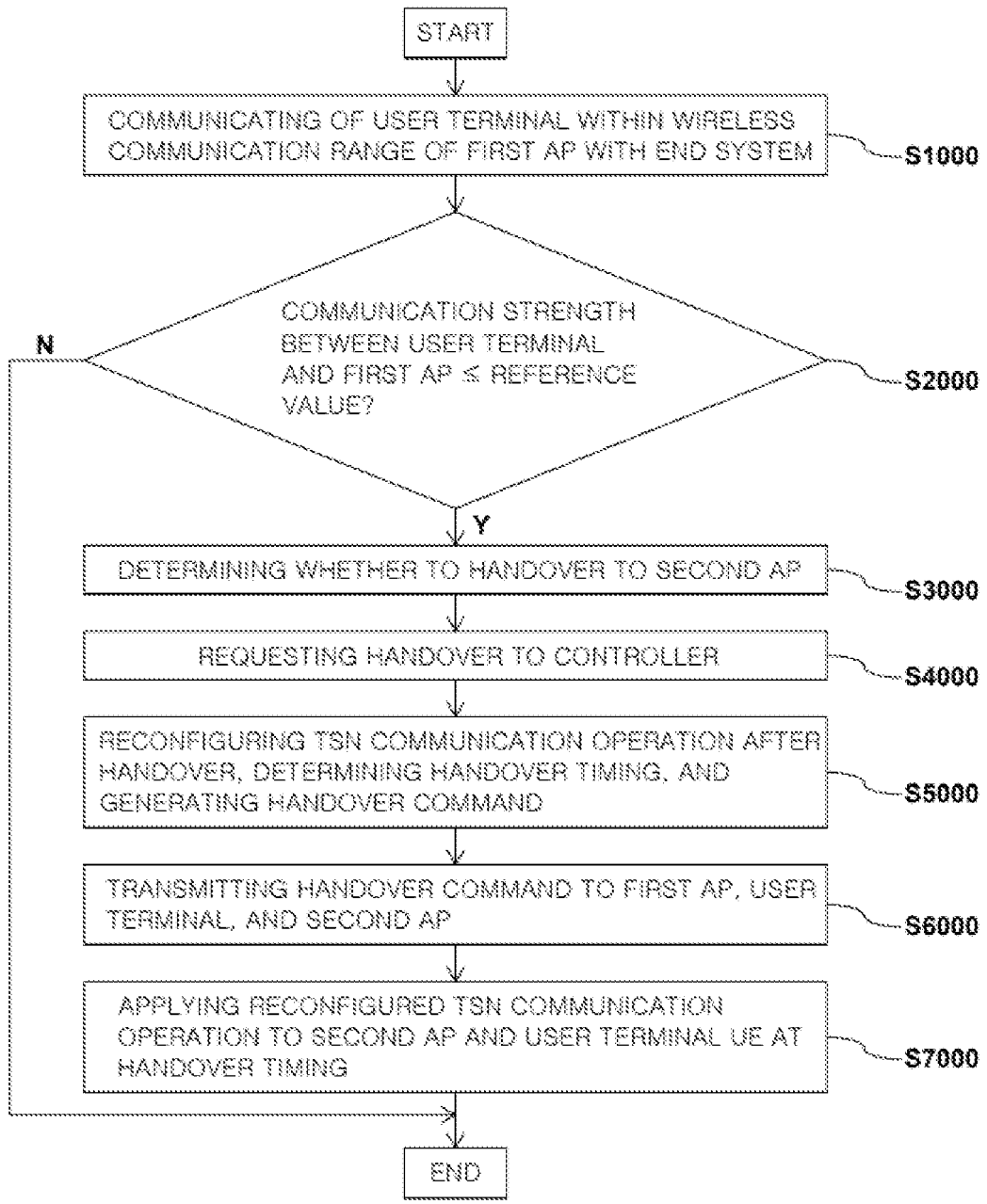
FIGS. 9 to 11 are flowcharts illustrating a network control method for handover in a mobile TSN communication system according to some embodiments.
Figure 10:
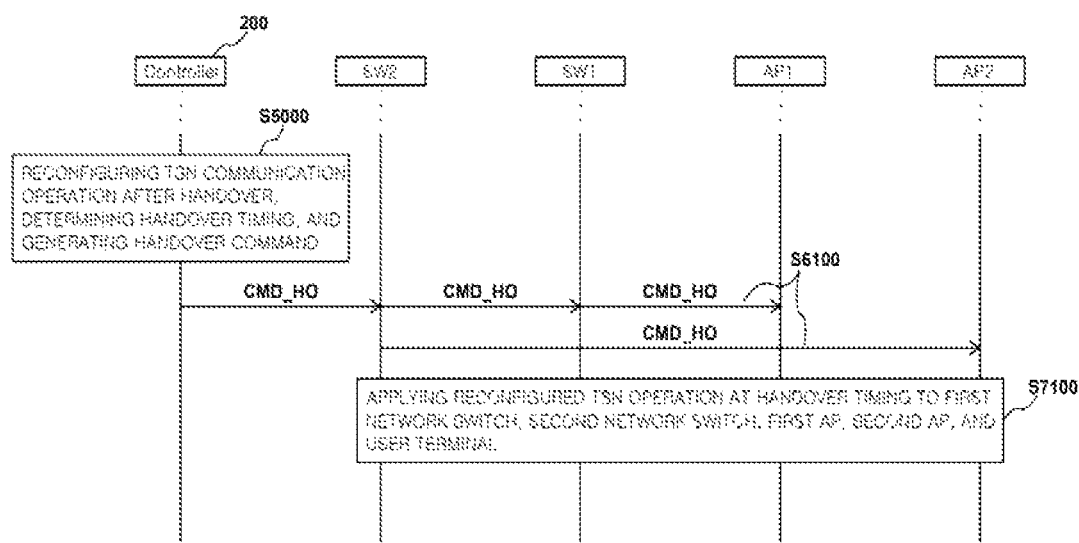
Figure 11:
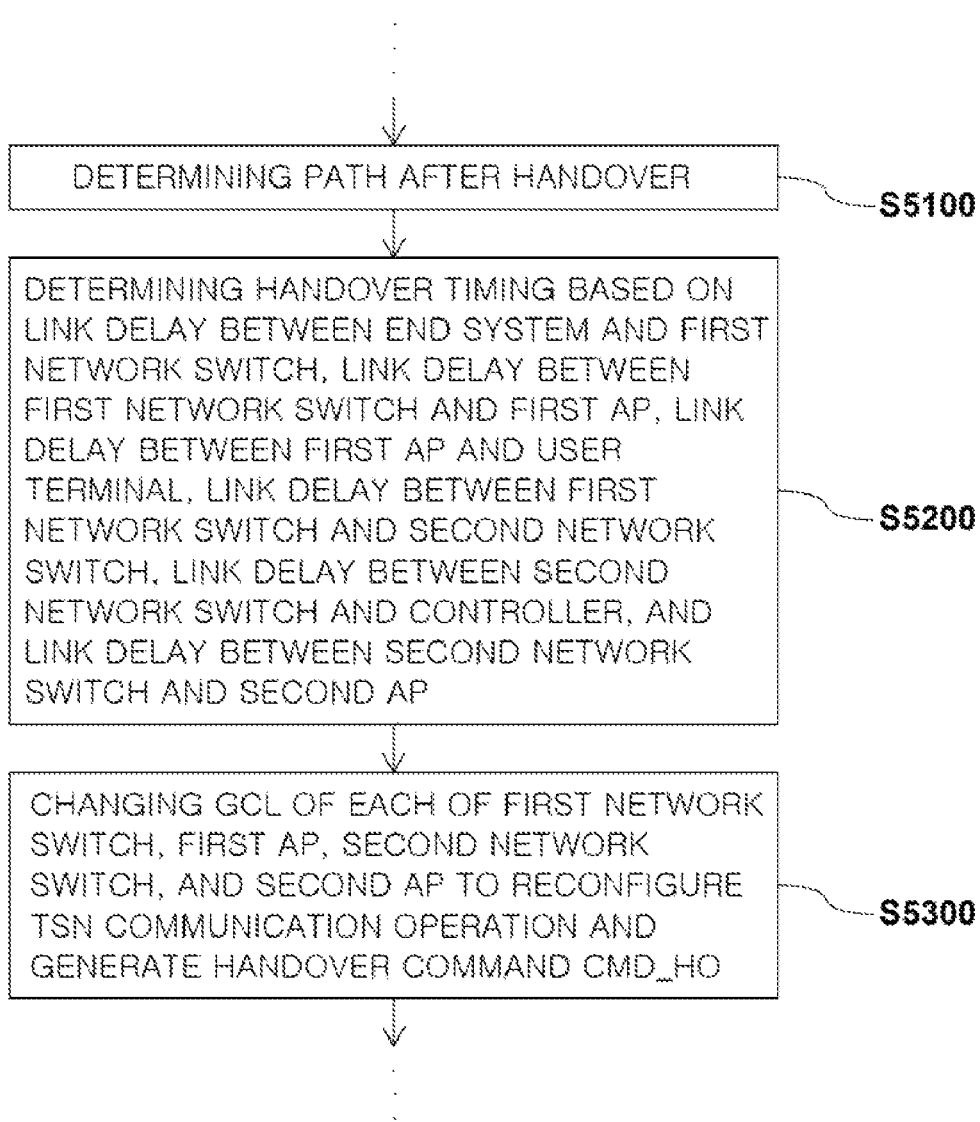

FIGS. 9 to 11 are flowcharts illustrating a network control method for handover in a mobile TSN communication system according to some embodiments. Hereinafter, in the network control method according to some embodiments, descriptions overlapping with those described above with reference to FIGS. 1 to 8 will be omitted.

Referring to FIG. 9, the network control method for handover in the mobile TSN communication system according to some embodiments may include operation S1000 of communicating of the user terminal UE within a wireless communication range of the first AP AP1 with the end system 100 through the first AP AP1, operation S2000 of determining communication strength between the user terminal UE and the first AP AP1, operation S3000 of determining whether to handover to the second AP AP2 based on a result of the determining, operation S4000 of requesting handover to the controller 200 when the handover to the second AP AP2 is determined, operation S5000 of the controller 200 reconfiguring a TSN communication operation after the handover, determining handover timing, and generating the handover command CMD_HO, operation S6000 of transmitting the handover command CMD_HO to the first AP AP1, the user terminal UE, and the second AP AP2, and operation S7000 of applying the reconfigured TSN communication operation to the second AP AP1 and the user terminal UE at the handover timing.

In this case, operation S2000 of determining communication strength between the user terminal UE and the first AP AP1 may include comparing the communication strength between the user terminal UE and the first AP AP1 with a predefined reference value. In operation S3000, when the communication strength between the user terminal UE and the first AP AP1 is less than or equal to the reference value, handover to the second AP AP2 may be determined.

Referring to FIG. 10, the first AP AP1 may communicate with the end system 100 through the first network switch SW1, and the second AP AP2 may communicate with the first network switch SW1 and the controller 200 through the second network switch SW2. In this case, operation S6000 of transmitting the handover command CMD_HO of FIG. 9 may include transmitting the handover command CMD_HO to the first network switch SW1, the first AP AP1, the user terminal UE, the second network switch SW2, and the second AP AP2.

Operation S7000 of applying the reconfigured TSN communication operation may include operation S7100 of applying the reconfigured TSN operation at the handover timing to the first network switch SW1, the second network switch SW2, the first AP AN, the second AP AP2, and the user terminal UE.

Referring to FIG. 11, operation S5000 of generating the handover command may include operation S5200 of generating the handover command CMD_HO by determining handover timing based on a link delay between the end system 100 and the first network switch SW1, a link delay between the first network switch SW1 and the first AP AP1, a link delay between the first AP AP1 and the user terminal UE, a link delay between the first network switch SW1 and the second network switch SW2, a link delay between the second network switch SW2 and the controller 200, and a link delay between the second network switch SW2 and the second AP AP2.

In addition, operation S5000 of generating the handover command may include operation S5300 of changing a GCL of each of the first network switch SW1, the first AP AN, the second network switch SW2, and the second AP AP2 to reconfigure the TSN communication operation and generate the handover command CMD_HO.

In concluding the detailed description, those skilled in the art will appreciate that many variations and modifications may be made to the preferred embodiments without substantially departing from the principles of the present invention. Therefore, the disclosed preferred embodiments of the invention are used in a generic and descriptive sense only and not for purposes of limitation.

What is claimed is:

1. A network control method for handover in a mobile time-sensitive network (TSN) communication system by a user terminal and a controller, the network control method comprising:

communicating, by the user terminal within a wireless communication range of a first access point (AP), with an end system through the first AP;

determining, by the user terminal, whether to handover to a second AP by determining communication strength between the user terminal and the first AP;

requesting, by the user terminal, handover to the controller when the handover to the second AP is determined;

reconfiguring a TSN communication operation after the handover, determining handover timing, and generating a handover command by the controller;

transmitting, by the controller, the handover command to the first AP, the user terminal, and the second AP; and applying, by the controller, the reconfigured TSN communication operation to the second AP and the user terminal at the handover timing, wherein the first AP communicates with the end system through a first network switch, and the second AP communicates with the first network switch and the controller through a second network switch, wherein the transmitting of the handover command includes transmitting the handover command to the first network switch, the first AP, the user terminal, the second network switch, and the second AP, wherein the applying of the reconfigured TSN communication operation includes applying the reconfigured TSN operation to the first network switch, the second network switch, the second AP, and the user terminal at the handover timing.

2. The network control method of claim 1, wherein the generating of the handover command comprises: generating the handover command by determining the handover timing based on a link delay between the end system and the first network switch, a link delay between the first network switch and the first AP, a link delay between the first AP and the user terminal, a link delay between the first network switch and the second network switch, a link delay between the second network switch and the controller, and a link delay between the second network switch and the second AP.

3. The network control method of claim 2, wherein the generating of the handover command comprises: reconfiguring the TSN communication operation by changing a gate control list (GCL) of each of the first network switch, the first AP, the second network switch, and the second AP.

4. The network control method of claim 1, wherein the determining of whether to handover to the second AP comprises: determining a handover request time by the first AP and determining whether to handover based on a result of the determining of the first AP.

* * * * *